US006972833B2

(12) United States Patent
Hashiguchi

(10) Patent No.: US 6,972,833 B2
(45) Date of Patent: Dec. 6, 2005

(54) PLATE POSITIONING AND PROCESSING METHOD AND PLATE POSITIONING AND PROCESSING APPARATUS

(75) Inventor: Akihiro Hashiguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 68 days.

(21) Appl. No.: 10/802,880

(22) Filed: Mar. 18, 2004

(65) Prior Publication Data

US 2004/0189960 A1 Sep. 30, 2004

(30) Foreign Application Priority Data

Mar. 25, 2003 (JP) ............................ 2003-083361

(51) Int. Cl.[7] .......................... G03B 27/04; B41C 1/00
(52) U.S. Cl. .......................... 355/85; 355/86; 101/486
(58) Field of Search ........................ 355/40, 47, 85–86, 355/407; 101/415.1, 477, 486; 271/238, 271/250

(56) References Cited

U.S. PATENT DOCUMENTS 4,956,662 A * 9/1990 Sakai et al. ................ 355/403
6,299,572 B1 10/2001 Harari
6,662,725 B1 * 12/2003 Koizumi et al. ............ 101/486
2001/0052972 A1 12/2001 Ozaki

FOREIGN PATENT DOCUMENTS

JP 2001-356489 A 12/2001
JP 2003-095488 A 4/2003
JP 2003-095489 A 4/2003

* cited by examiner

*Primary Examiner*—Henry Hung Nguyen
(74) *Attorney, Agent, or Firm*—Sughrue Mion, PLLC

(57) ABSTRACT

Plate positioning and processing method and apparatus are disclosed. A plate is conveyed in a predetermined first direction so that the plate is in contact with a pair of first positioning pins. The plate is laterally moved contacting with the first positioning pins until reference positions displaced from contacting positions of the plate with the first positioning pins contact with the first positioning pins. A predetermined first processing is applied to the plate. The plate subjected to the first processing is conveyed in a predetermined second direction so that the plate is in contact with a pair of second positioning pins in positions different from the reference positions of front edge of the plate. The plate contacting with the second positioning pins is laterally moved until the same positions as the reference positions contact with the second positioning pins.

7 Claims, 10 Drawing Sheets

PLATE POSITIONING AND PROCESSING METHOD AND PLATE POSITIONING AND PROCESSING APPARATUS

BACKGROUND OF THE INVENTION

1. Field of the Invention

The present invention relates to a plate positioning and processing method and a plate positioning and processing apparatus, which are used in an image exposure apparatus and a punch unit.

2. Description of the Related Art

Hitherto, as an image exposure apparatus for creating a printing plate in which an image is exposed on a plate such as an aluminum foil sheet, there is known one in which the plate is wound around a rotating drum, and the plate is irradiated with a light beam according to image data, while the plate is rotated together with the rotating drum, so that the plate is exposed. According to this type of image exposure apparatus, a conveyer conveys obliquely below the plate put on a conveying belt, so that the top of the plate is in contact with a pair of pin rollers for a first positioning to perform a positioning of the front edge of the plate in a conveying direction, and thereafter, the conveyer is moved in a width direction perpendicular to the conveying direction, so that the side of the plate is in contact with a pin for a second positioning to perform a positioning in a width direction. Thereafter, the plate is inserted into a puncher so that a notch, which is used for positioning when the plate is wound around a rotating drum, is formed on the front edge of the plate (cf. for example, Japanese Patent Application Laid Open Gazette TokuKai. 2001-356489 (Page 1, FIG. 2).

In a color printing using a plurality of printing plates in which images are exposed on the plates, to perform a color printing with great accuracy, there is a need to ensure a so-called exposure recording position reproduction quality in which all the exposure recording positions on the plurality of printing plates are the same as one another. However, as mentioned above, when the front edge of the plate is in contact with the pin rollers for positioning through running the plate into the pin roller, it happens that hit marks due to plastic deformation are formed on the contact position of the plate. Magnitude and geometry of the hit mark vary in accordance with various factors such as geometry of the front edge of the plate, a supplying velocity of the plate, and a slope of the plate. Variation of magnitude and geometry of the hitting mark brings about slight variation of the slope of the plate when the plate is in contact with the pin rollers for the first positioning to perform the positioning of the front edge of the plate. Now, the exposure recording position reproduction quality on the plate needs high accuracy of several tens of $\mu$ meters units. And it happens that some magnitude and geometry of hitting marks bring about discrepancy, which is not allowed.

By the way, there is known a method that a punch device forms on a plate a punched hole to be used for positioning of a printing plate wherein a plate (the printing plate) after exposure is wound around a rotary press to perform printing processing. In case of this method, in order to obtain a predetermined printing accuracy, there is a need to implement a complete coincidence of a relative position of the plate between an image exposure position (a winding position around a rotating position) and a punch position (an inserting position into the punch device). However, in the event that the hitting mark is formed on the front edge of the plate, and the positioning pin rollers hit on the position of the hitting mark of the plate in the later processing step (either one of the image exposure and the punch processing), this involves a problem that the slope of the plate is increased because of addition of the hitting mark.

SUMMARY OF THE INVENTION

In view of the foregoing, it is an object of the present invention to provide a plate positioning and processing method and a plate positioning and processing apparatus, which are capable of performing positioning with great accuracy excluding an affect of hitting marks of the contact position of the plate.

To achieve the above-mentioned object, the present invention provides a plate positioning and processing method comprising:

a first step of conveying a plate in a predetermined first direction so that the plate is in contact with a pair of first positioning pins;

a second step of laterally moving the plate contacting with the first positioning pins until reference positions displaced from contacting positions of the plate with the first positioning pins contact with the first positioning pins;

a third step of applying a predetermined first processing to the plate;

a fourth step of conveying the plate subjected to the first processing in a predetermined second direction so that the plate is in contact with a pair of second positioning pins in positions different from the reference positions of front edge of the plate;

a fifth step of laterally moving the plate contacting with the second positioning pins until same positions as the reference positions contact with the second positioning pins; and a sixth step of applying a predetermined second processing to the plate.

According to the plate positioning and processing method of the present invention, even if hitting marks are formed on the front edge of the plate owing to the contact with the positioning pins, it is possible to perform the positioning of the plate always in the same posture, removing the influence of hitting marks onto the plate at the times of first processing and second processing. Further, according to the present invention, portions of the front edges of the plate, which contact with positioning pins in the times of first processing and second processing, are the same reference positions. This feature makes it possible to implement complete coincidence of the positions of the plate in both processing times, even if the front edge of the plate brings about bends and the like.

In the plate positioning and processing method according to the present invention as mentioned above, it is preferable that between the third step and the fourth step there is a step of laterally moving the plate until predetermined positions of the front edge of the plate, which is different from the reference positions and the contacting positions, contact with the first positioning pins.

To achieve the above-mentioned object, the present invention provides a plate positioning and processing apparatus comprising:

first conveying means that conveys a plate in a first predetermined direction;

a pair of first positioning pins that determine a position of the first predetermined direction of the plate in contact with a front edge of the plate to be conveyed in the first predetermined direction;

second conveying means that laterally moves the plate contacting with the first positioning pins until reference positions displaced from contacting positions of the plate with the first positioning pins contact with the first positioning pins;

first processing means that applies a predetermined first processing to the plate;

third conveying means that conveys the plate subjected to the first processing in a second predetermined direction;

a pair of second positioning pins that determine a position of the second predetermined direction of the plate in contact with positions of the front edge of the plate to be conveyed in the second predetermined direction, which positions are different from the reference positions;

fourth conveying means that laterally moves the plate contacting with the second positioning pins until same positions as the reference positions contact with the second positioning pins; and second processing means that applies a predetermined second processing to the plate.

According to a plate positioning and processing apparatus of the present invention, even if hitting marks are formed on the front edge of the plate owing to the contact with the positioning pins, it is possible to perform the positioning of the plate always in the same posture, removing the influence of hitting marks onto the plate at the times of first processing and second processing. Further, according to the present invention, portions of the front edges of the plate, which contact with positioning pins in the first processing means and the second processing means, are the same reference positions. This feature makes it possible to implement complete coincidence of the positions of the plate in both processing means, even if the front edge of the plate brings about bends and the like.

In the plate positioning and processing apparatus according to the present invention as mentioned above, it is preferable that the plate positioning and processing apparatus further comprises fifth conveying means that laterally moves the plate until predetermined positions different from the reference positions and the contacting positions, of the front edge of the plate subjected to the first processing, contact with the first positioning pins, the second positioning pins are disposed at positions wherein the front edge of the plate contacts with same positions as the reference positions, in a case where the plate is conveyed by the third conveying means omitting processing that the plate is laterally moved by the fifth conveying means, and the third conveying means conveys the plate laterally moved by the fifth conveying means in the second predetermined direction.

In the plate positioning and processing apparatus according to the present invention as mentioned above, it is preferable that the second positioning pins are disposed at positions wherein the front edge of the plate conveyed by the third conveying means in the second predetermined direction, contacts with positions different from the reference positions.

In the plate positioning and processing apparatus according to the present invention as mentioned above, it is preferable that the first processing means is punch means that forms on the plate punched holes for positioning.

In the plate positioning and processing apparatus according to the present invention as mentioned above, it is preferable that the second processing means is exposure means that exposes images on the plate.

DETAILED DESCRIPTION OF PREFERRED EMBODIMENTS

Embodiments of the present invention will be described with reference to the accompanying drawings.

Figure 1:
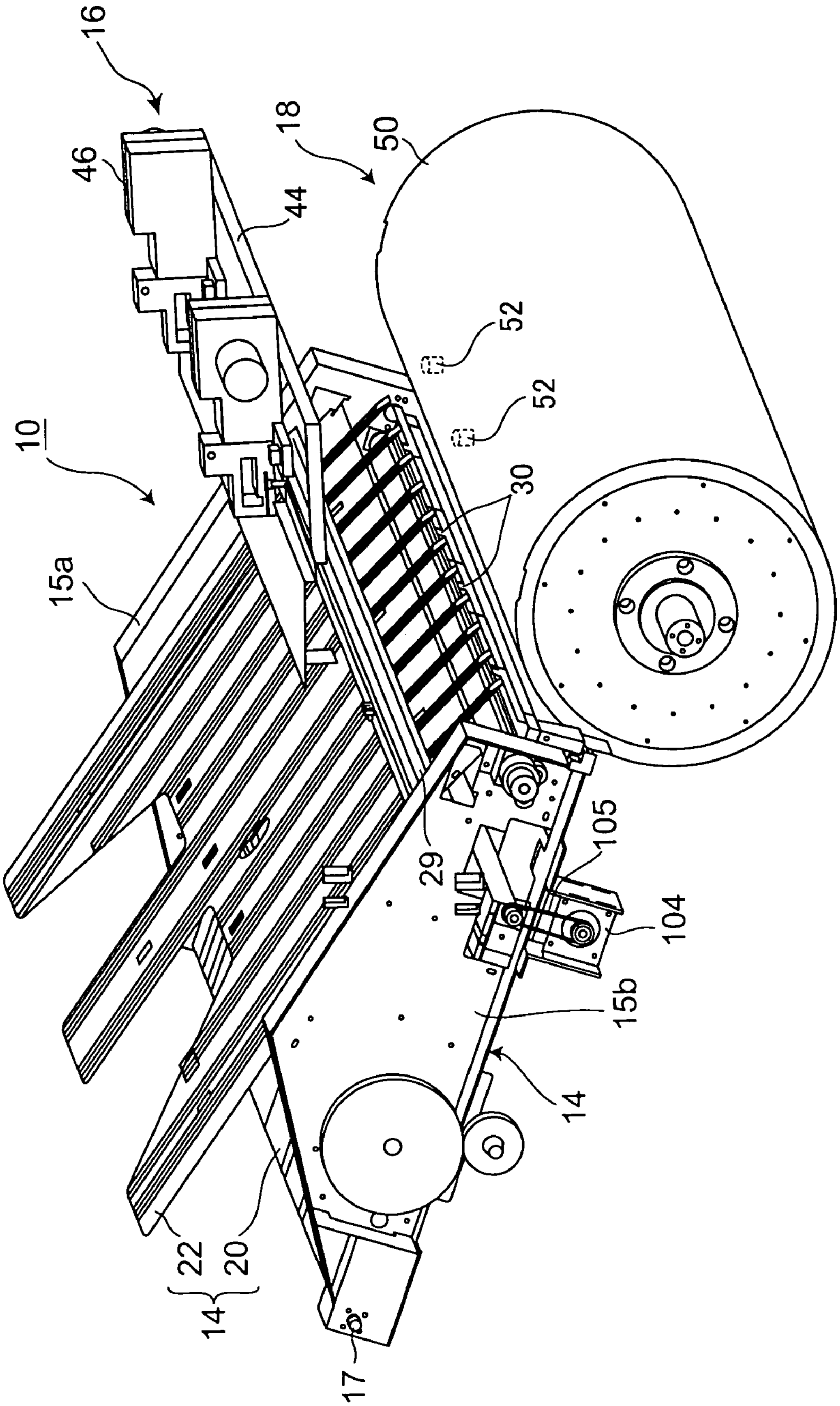
FIG. 1 is a perspective view of an image exposure apparatus according to an embodiment of the present invention.
Figure 2:
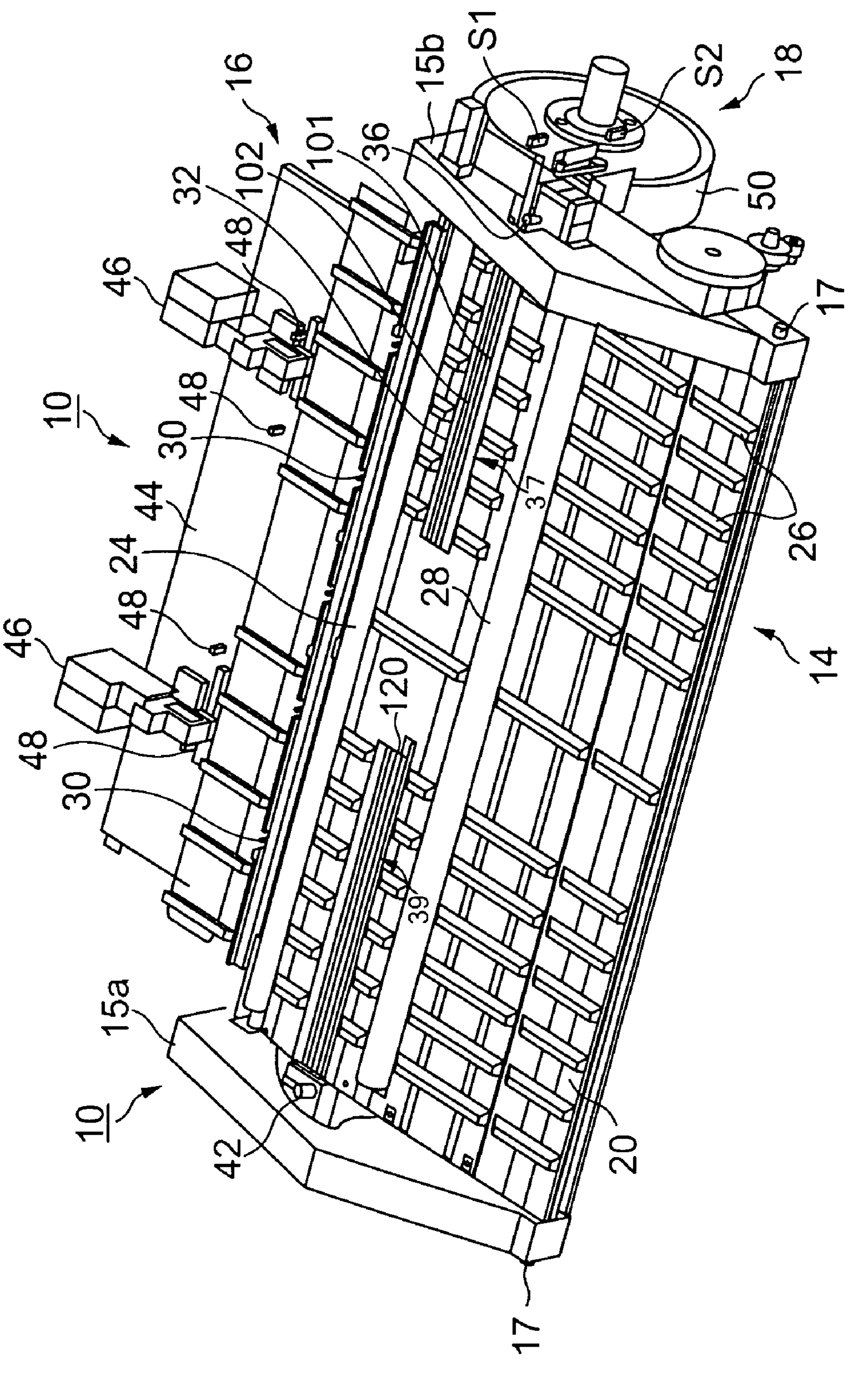
FIG. 2 is a perspective view of an image exposure apparatus according to an embodiment of the present invention, wherein a plate delivery guide is removed.
Figure 3:
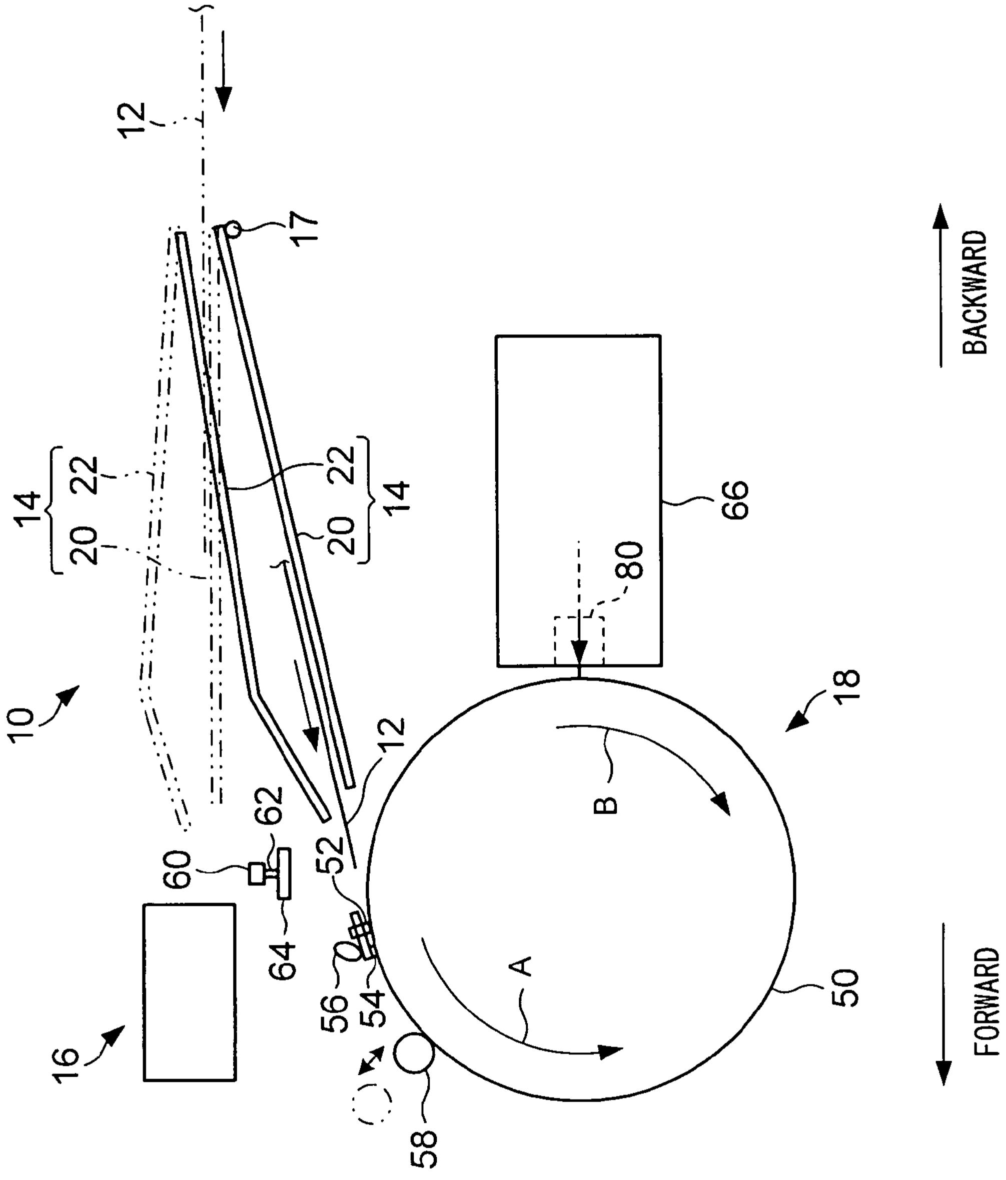
FIG. 3 is a schematic side view of an image exposure apparatus according to an embodiment of the present invention.

FIG. 1 is a perspective view of an image exposure apparatus 10 according to an embodiment of the present invention. FIG. 2 is a perspective view of an image exposure apparatus according to an embodiment of the present invention, wherein a plate delivery guide is removed. FIG. 3 is a schematic side view of an image exposure apparatus according to an embodiment of the present invention.

As shown in FIG. 1, FIG. 2 and FIG. 3, the image exposure apparatus 10 exposes an image on a plate 12 consisting of an aluminum foil sheet, the plate 12 having a sensitizing layer on a surface of the plate 12. In front of a conveying guide unit 14, there is disposed a punch section 16. And below the punch section 16, there is disposed an exposure section 18.

The conveying guide unit 14 comprises a plate feed guide 20 shaped as an approximately quadrilateral plate, a plate delivery guide 22 shaped as approximately quadrilateral plate, which is disposed on the upper portion of the plate feed guide 20, and left frame 15*a* and right frame 15*b* provided at both sides.

The conveying guide unit 14 rotatably moves by a predetermined angle on a fulcrum 17 provided on the rear end portion in FIG. 1 to FIG. 3. This rotatable movement makes it possible that the plate feed guide 20 and the plate delivery guide 22 selectively face the punch section 16 and the exposure section 18.

As shown in FIG. 2, at the front portion of the plate feed guide 20, there are provided cylindrical front conveying roller 24 and back conveying roller 28 in such a manner that they are rotatable and project onto the plate feed guide 20. When the front conveying roller 24 and back conveying roller 28 are rotated forward and reversely by a plate feed roller driving motor 140 (cf. FIG. 8), the plate 12 put on the plate feed guide 20 is conveyed forward or backward. As shown in FIG. 1, at the front portion of the plate delivery guide 22, there is provided a cylindrical plate delivery roller 29 in such a manner that the roller 29 is rotatable and projects onto the plate delivery guide 22. When the plate delivery roller 29 is rotated by a plate delivery roller driving motor 141 (cf. FIG. 8), the plate 12 put on the plate feed guide 20 is conveyed backward.

As shown in FIG. 2, on the plate feed guide 20, there are provided a large number of trapezoidal columnar ribs 26. Those ribs 26 are disposed in parallel with respect to the lateral direction, and is set up in such a manner that height of the rib in projection onto the plate feed guide 20 is slightly lower than the front conveying roller 24. The use of the ribs 26 contributes to reduction of the frictional force involved in conveyance of the plate 12 by rotation of the conveying roller 28.

Figure 4:
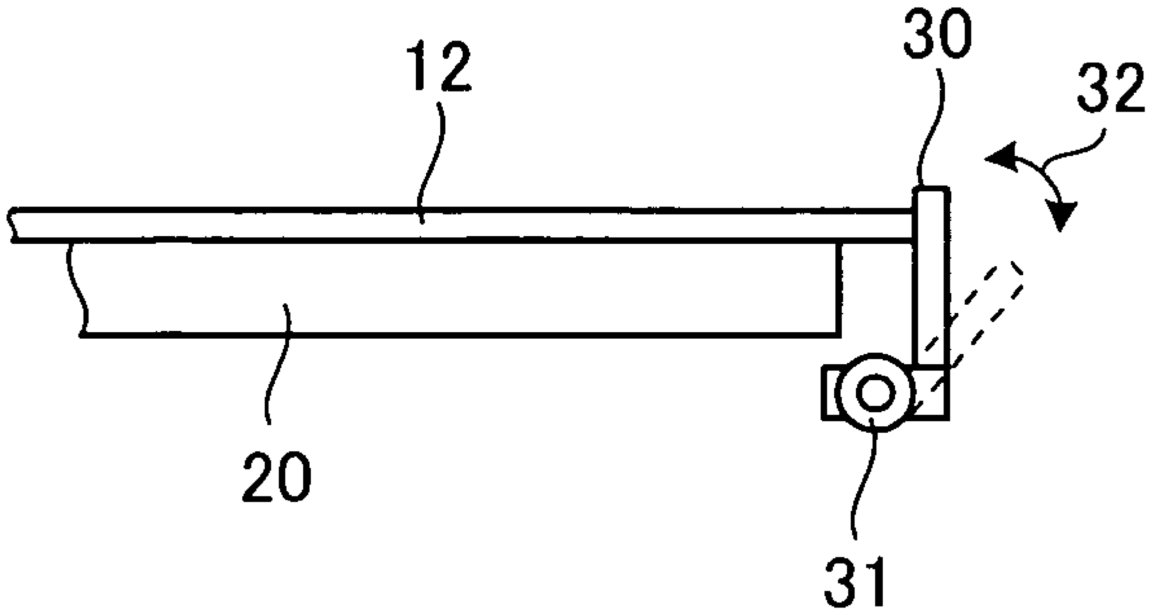
FIG. 4 is a side view of a preset member.

FIG. 4 is a side view of a preset member. As shown in FIG. 4, at the front of the plate feed guide 20, there is provided a preset member 30 used for provisional positioning of the plate. The preset member 30 is a plate-like shaped stopper member that is coupled with a motor 31 to rotatably move on a reciprocating basis in directions as shown by an arrow 32, so that the preset member 30 is advanced to the front edge of the plate 12 or is withdrawn from the plate feed guide 20 as shown by the dot dash line.

When the conveying roller 24 conveys the printing plate 12 forward, the front edge of the plate 12 bumps against the preset member 30. Thus, a positioning of the front edge of the plate 12 is carried out. Since the preset member 30 is of a plate-like shaped one, no mark is formed on the front edge of the plate 12. When the preset member 30 is withdrawn, it is possible that the conveying roller 24 causes the plate 12 to be conveyed forward over the front edge of the plate feed guide 20. Thereafter, as will be mentioned later, first positioning pins 48 of a punch unit 46 carries out regular positioning.

As shown in FIG. 2, at the right side of the plate feed guide 20, there is formed a slit 32, which is substantially parallel with the conveying rollers 24 and 28 in the vicinity of the rear side of the conveying roller 24. Below the slit 32, there is disposed a reference pin moving unit 37 in parallel with the slit 32.

Figure 5:
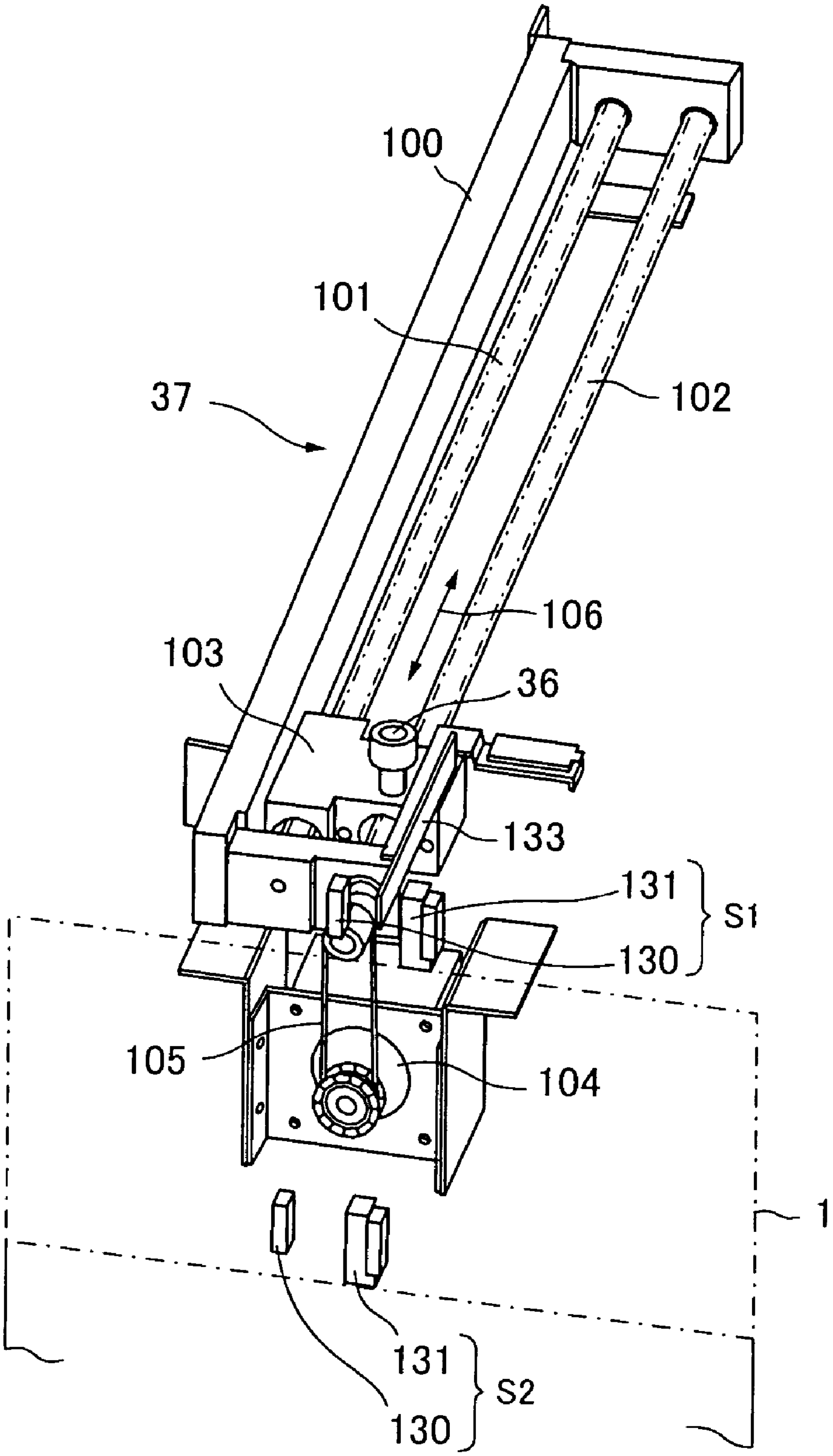
FIG. 5 is a perspective view of a reference pin-moving unit.

FIG. 5 is a perspective view of a reference pin moving unit 37. As shown in FIG. 4, the reference pin moving unit 37 comprises a guide member 101 fixed on a frame 100, and a feed screw 102 rotatably mounted on the frame 100, the feed screw 102 being in parallel to the guide member 101. A moving member 103 is slidably mounted on the guide member 101 and is screwed to the feed screw 102. A reference pin 36 is rotatably mounted on the top of the moving member 103 and projects over the slit 32. The feed screw 102 is driven by a driving motor 104 installed in the frame 100 via a timing belt 105, so that the moving member 103 reciprocates in an arrow 106 and the reference pin 36 reciprocates projecting from the slit 32.

The reference pin 36 is located at a home position of the right end of the plate feed guide 20 beforehand, that is, a detecting position of an upper home position sensor S1 and a lower home position sensor S2. A criterion of the right end of the plate 12 is determined in such a manner that the reference pin 36 moves from the home position to the left in accordance with a size of the plate 12 put on the plate feed guide 20.

A detection bracket 133 extending substantially horizontally is mounted on the moving member 103 of the reference pin moving unit 37. When the detection bracket 133 enters between a light-emitting device 130 and a photo-electric element 131, the photo-electric element 131 turns on to detect the home position of the reference pin 36 as will be described later. The upper home position sensor S1 detects the home position wherein the conveying guide unit 14 is located at the punch position (the position depicted by the dot dash line in FIG. 3). The lower home position sensor S2 detects the home position wherein the conveying guide unit 14 is located at the supply position (the position depicted by the solid line in FIG. 3) to the rotating drum 50.

Again referring to FIG. 2, at the left side of the plate feed guide 20, there is formed a slit 38 substantially in parallel to the front conveying roller 24 and the back conveying roller 28. Below the slit 38, there is disposed a width direction moving unit 39 in parallel to the slit 38.

Figure 6:
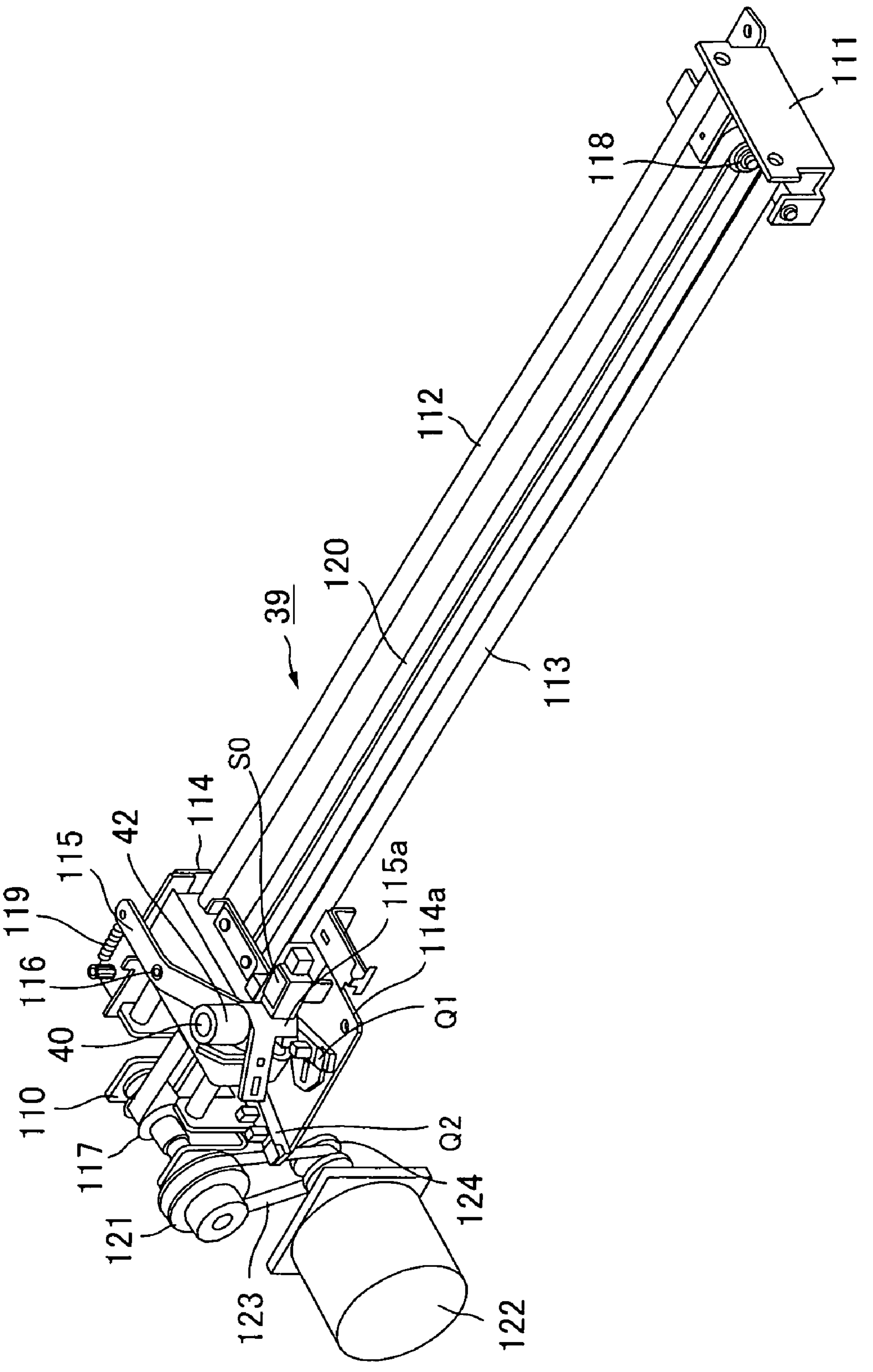
FIG. 6 is a perspective view of a width direction moving unit.

FIG. 6 is a perspective view of the width direction moving unit 39.

The width direction moving unit 39 comprises guide members 112 and 113 fixed between frames 110 and 111, and a moving member 114 which is movably mounted on the guide members 112 and 113. At the upper portion of the moving member 114, a connecting lever 115 is rotatably mounted on a fulcrum 116. A columnar conveying pin 42 is rotatably supported on a support shaft 40 of the connecting lever 115. The conveying pin 42 projects from the slit 38. A pressurizing spring 119 enables the connecting lever 115 anticlockwise in FIG. 6, that is, in a direction that the conveying pin 42 moves forward.

A first timing belt 120 is built between pulleys 117 and 118 provided on the frames 110 and 111, respectively. The moving member 114 is fixed on the first timing belt 120. A driving pulley 121 is installed in a shaft of the pulley 117 provided on the frame 111. A second timing belt 123 is built between the driving pulley 121 and a motor pulley 124 of a driving motor 122 mounted on the frame 110.

As shown in FIG. 1 and FIG. 2, the punch section 16 comprises a predetermined number of punch units 46 (in this case, two punch units) provided on the supporting plate 44 shaped as a plate. At the rear of each of the punch units 46, there is provided the first positioning pin 48.

The exposure section 18, which is disposed below the punch units 46, is provided with the columnar rotating drum 50. As will be described later, after the punched holes are formed, when the plate 12, which is returned from the punch section 16 to the plate feed guide 20, is subjected to the provisional positioning, the conveying guide unit 14 goes down in the front edge and rotatably moves to the position depicted by the solid line in FIG. 3 so that the plate feed guide 20 faces a tangential direction of the rotating drum 50, and the preset member 30 goes down from the upper surface of the plate feed guide 20. In this condition, the plate 12 (depicted by the solid line) is conveyed by the conveying roller 24 so that the front edge of the plate 12 is located at the peripheral surface of the rotating drum 50.

As shown in FIG. 3, at the peripheral surface of the rotating drum 50, there is provided at least pair of second positioning pins 52. Further, in the vicinity of the respective second positioning pin 52 on the peripheral surface of the rotating drum 50, there is provided a front edge chuck 54. Upper the front edge chuck 54 there is provided a cam 56. When the cam 56 urges the front side of the front edge chuck 54, the rear side of the front edge chuck 54 separates from the peripheral surface of the rotating drum 50. Thus, the front edge of the plate 12 conveyed from the plate feed guide 20 to the peripheral surface of the rotating drum 50 is inserted between the rear side of the front edge chuck 54 and the peripheral surface of the rotating drum 50, and in this condition the regular positioning of the plate 12 is carried out. After the regular positioning of the plate 12 is carried out, the cam 56 rotatably moves to release the depression of the front edge chuck 54, so that the rear side of the front edge chuck 54 rotatably moves by a spring (not illustrated) provided inside the front edge chuck 54. Thus, the front edge of the plate 12 is urged and held on the peripheral surface of the rotating drum 50. When the front edge of the plate 12 is held on the peripheral surface of the rotating drum 50, the rotating drum 50 rotates in the direction of the arrow A in FIG. 2, so that the plate 12 wound around the peripheral surface of the rotating drum 50.

In the vicinity of the peripheral surface of the rotating drum 50, there is provided a squeeze roller 58, which is detachably from the rotating drum 50, in the side of the direction of the arrow A in FIG. 3 with respect to the mounting cam 56. When the squeeze roller 58 moves to the side of the rotating drum 50, the squeeze roller 58 urges the plate 12 to be wound around the rotating drum 50 toward the rotating drum 50 and rotates, so that the plate 12 is in closely contact with the peripheral surface of the rotating drum 50.

Further, in the vicinity of the peripheral surface of the rotating drum 50, there is provided a rear chuck detachable unit 60 in the side of the direction of the arrow B in FIG. 3 with respect to the mounting cam 56. The rear chuck detachable unit 60 has a shaft 62, which is movable to the rotating drum 50. A rear chuck 64 is mounted on the top of the shaft 62. When the rear edge of the plate 12 wound around the rotating drum 50 faces the rear chuck detachable unit 60, the shaft 62 causes the rear chuck 64 to move to the side of the rotating drum 50 so that the rear chuck 64 is mounted on a predetermined position of the rotating drum 50 and is separated from the shaft 62. Thus, the rear chuck 64 urges the rear edge of the plate 12, so that the rear edge of the plate 12 is held on the peripheral surface of the rotating drum 50.

In this manner, when the front edge and the rear edge of the plate 12 are held on the peripheral surface of the rotating drum 50 by the front edge chuck 54 and the rear chuck 64, the squeeze roller 58 is separated from the rotating drum 50, and the rotating drum 50 rotates at a predetermined rotating speed. Thus, the plate 12 is conveyed on the plate feed guide 20 and is wound around the rotating drum 50.

Figure 7:
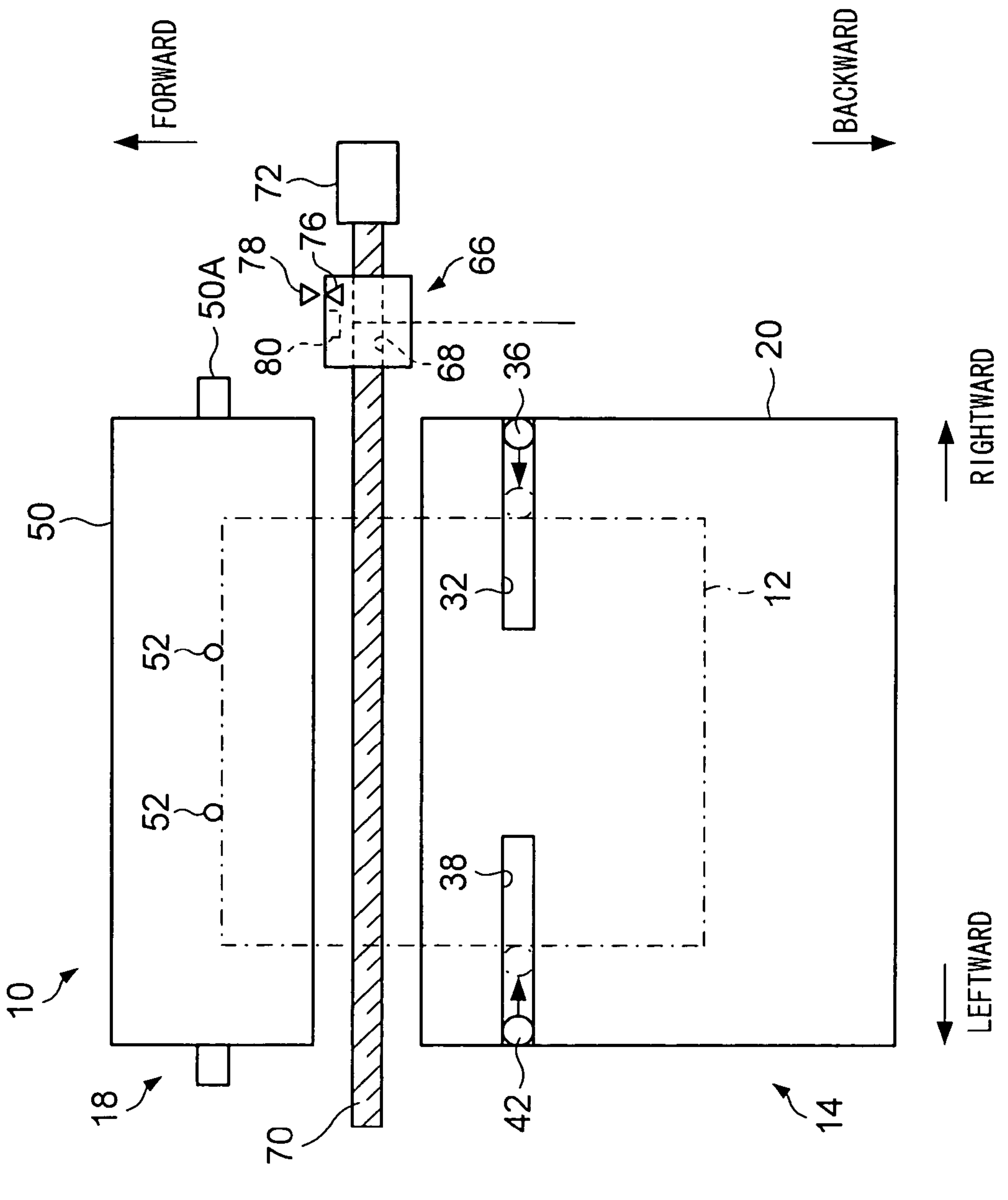
FIG. 7 is a plan view of essential portions of an image exposure apparatus according to an embodiment of the present invention.

As shown in FIG. 3 and FIG. 7, in the vicinity of the back of the peripheral surface of the rotating drum 50, there is disposed a recording head section 66 as an image recording section. As shown in FIG. 7, the recording head section 66 is provided with a female screw 68. In the vicinity of the back of the periphery of the rotating drum 50, there is disposed a feed screw 70 in parallel to the direction of a shaft 50A of the rotating drum. One end (the right side in the present embodiment) of the feed screw 70 is coupled with a pulse motor 72 (a stepping motor), so that driving of the pulse motor 72 makes it possible that the feed screw 70 rotates. The female screw 68 of the recording head section 66 is engaged with the feed screw 70 on a spiral basis. When the feed screw 70 rotates by the drive of the pulse motor 72, the recording head section 66 moves in the shaft line direction of the rotating drum 50.

The recording head section 66 is provided with a head home position-detecting sensor 76. When the head home position-detecting sensor 76 detects a home position mark 78 which is disposed at a predetermined position in the vicinity of the rotating drum 50, the recording head section 66 is disposed on a home position.

In the recording head section 66, a light beam, which is modulated in accordance with the read image data, is projected from an irradiation lens 80 to the rotating drum 50 to be rotated at high speed in synchronism with the rotation of the rotating drum 50, so that the plate 12 is exposed in accordance with the image data. This exposure processing is a so-called scanning exposure processing that while the rotating drum 50 is rotated at high speed (the main scanning), the recording head section 66 is moved to the shaft line direction of the rotating drum 50 (the sub-scanning).

When the scanning exposure to the plate 12 is terminated, the rotating drum 50 temporarily stops in its rotating operation at the position that the rear edge chuck 64 faces the shaft 62 to remove the rear edge chuck 64 from the rotating drum 50, so that the pressure to the rear edge of the plate 12 by the rear edge chuck 64 is released. Further, after the conveying guide unit 14 rotatably moves and the plate delivery guide 22 faces the tangential direction to the rotating drum 50 as shown with the solid line in FIG. 3, the rotating drum 50 rotates in the direction as indicated by the arrow B in FIG. 3. Thus, the plate 12 is delivered from the rear edge side to the plate delivery guide 22. At that time, the cam 56 rotatably moves to press the front side of the front edge chuck 54, so that the pressure to the front edge of the plate 12 by the back side of the front edge chuck 54 is released.

When the plate 12 is transmitted to the plate delivery guide 22, the conveying roller 29 rotatably moves to deliver the plate 12 from the plate delivery guide 22, so that the plate 12 is conveyed to a developing unit or a printing unit (not illustrated) involved in the subsequent step adjacent to the image exposure apparatus 10.

Figure 8:
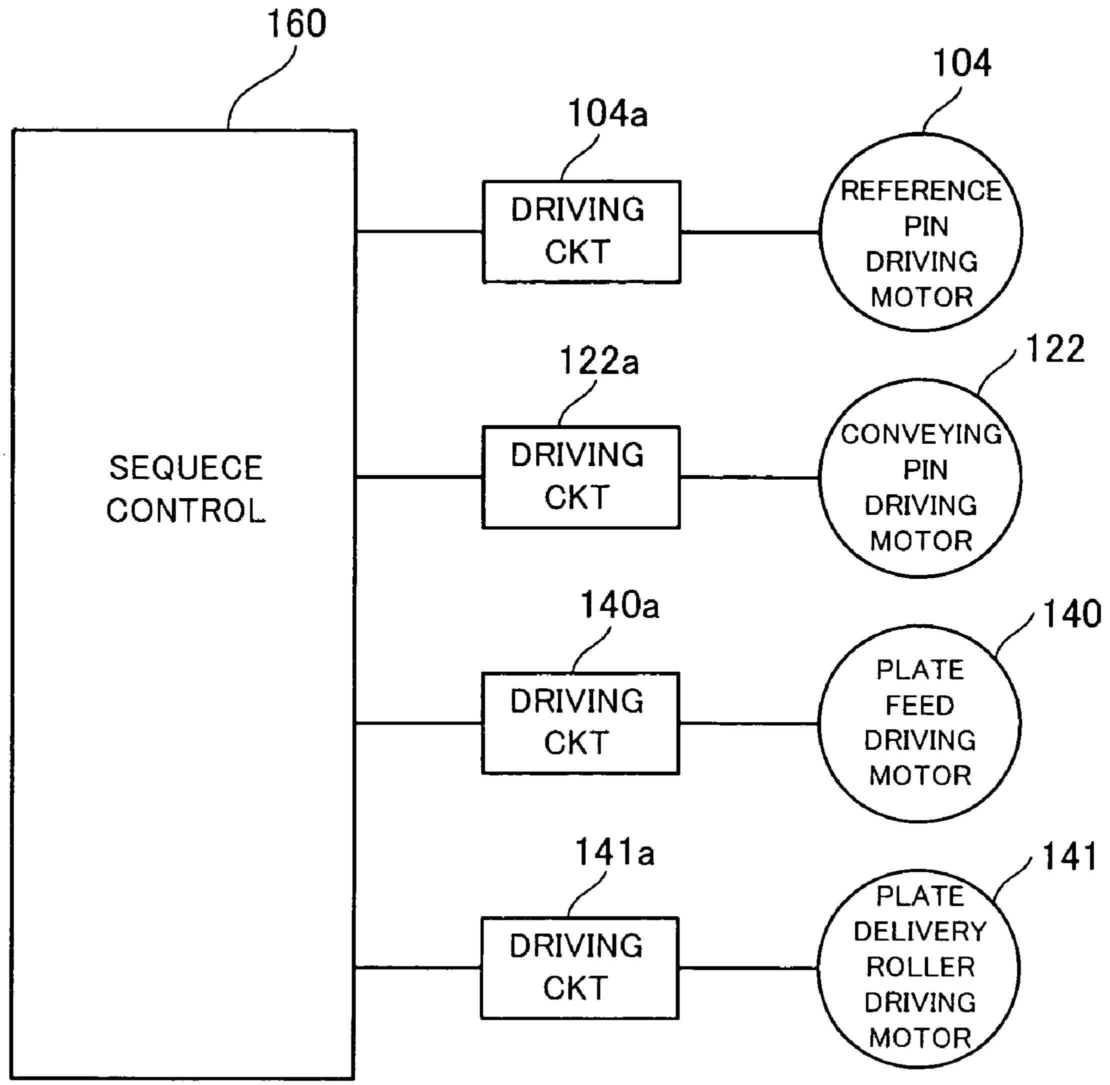
FIG. 8 is a sequence control circuit diagram of an image exposure apparatus according to an embodiment of the present invention.

FIG. 8 is a sequence control circuit diagram of an image exposure apparatus according to an embodiment of the present invention.

Connected to a sequence control section 160 are a driving circuit 104*a* of the driving motor 104 of the reference pin 36, a driving circuit 122*a* of the driving motor 122 of the conveying pin 42, a driving circuit 140*a* of the driving motor 140 of the plate feed rollers 24 and 28, and a driving circuit 141*a* of the driving motor 141 of the plate delivery roller 29.

Figure 9:
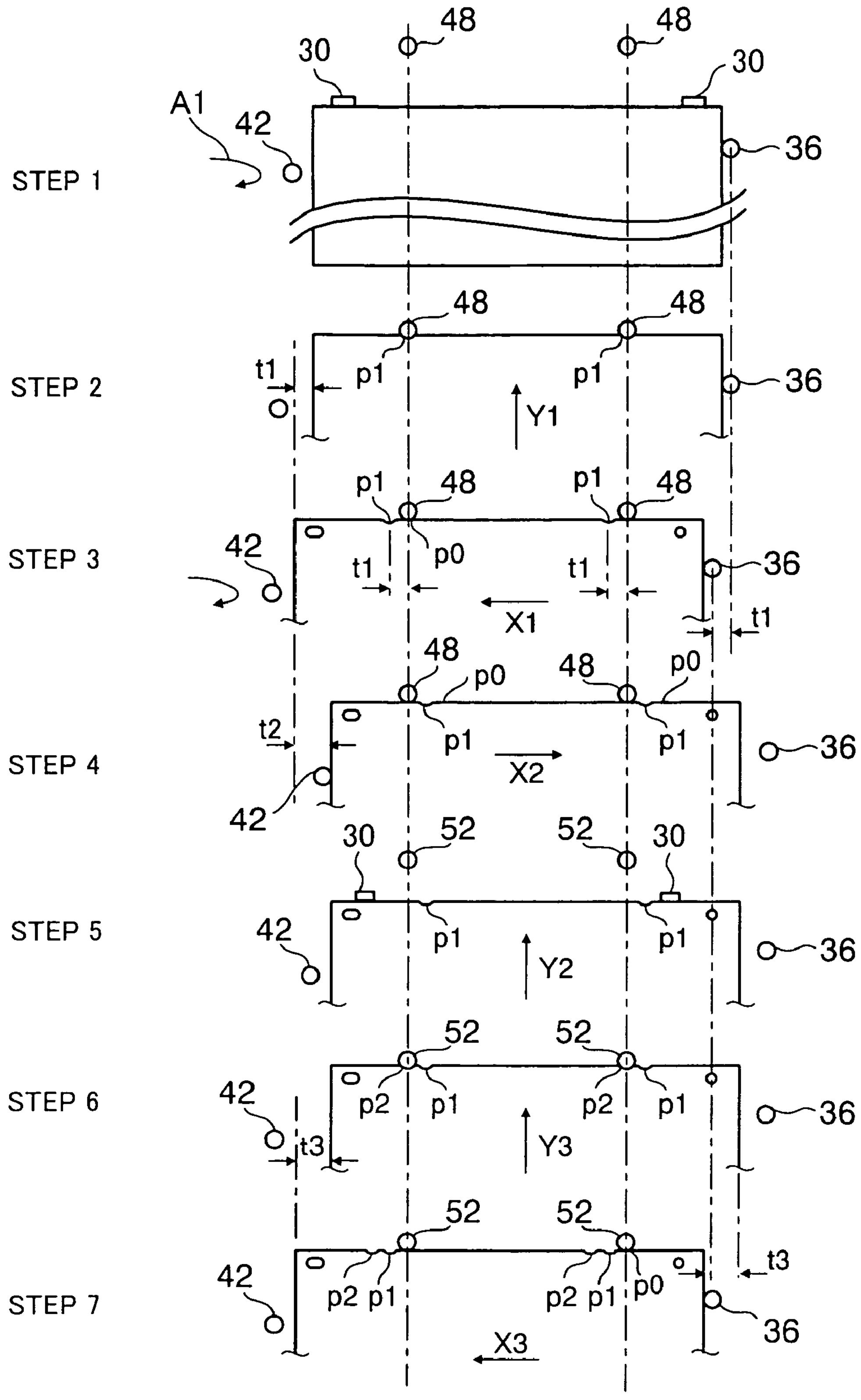
FIG. 9 is an explanatory view useful for understanding steps of positioning of a plate according to an embodiment 1.

FIG. 9 is an explanatory view useful for understanding steps of positioning of a plate according to an embodiment 1. Hereinafter, there will be explained an operation for positioning of the plate 12 referring to FIG. 3 and FIG. 9.

The conveying guide unit 14 is raised at the position depicted by the dot dash line in FIG. 3 (the initial state). First, size information, such as length, width and thickness of the plate 12, is inputted into control means (not illustrated), and then the plate 12 is put on the plate feed guide 20. At that time, any one is acceptable, as a plate feed scheme, which is concerned with a manual insertion or an automatic feed. The plate 12 on the plate feed guide 20 is put in a relatively rough state.

In this condition, the conveying rollers 24 and 28 conveys the plate 12 forward, so that the front edge of the plate 12 bumps against the preset member 30 (step 1 in FIG. 9). At that time, the conveying rollers 24 and 28 rotate and slip with the plate 12.

In this condition, the reference pin 36 moves by the migration length that is computed from width size information for the plate 12 in accordance with signals from the sequence control section 160 shown in FIG. 8. More in details, the driving motor 104 of the reference pin moving unit 37 shown in FIG. 7 is driven by the width size information for the plate 12 is driven so that the reference pin 36 and the detection bracket 133 enter via the timing belt 105, the feed screw 102 and the moving member 103 between the light-emitting device 130 of the upper home position sensor S1 and the photo-electric element 131, and the photo-electric element 131 turns on. The driving motor 104 reversely rotates in accordance with a signal when the photo-electric element 131 turns on, so that the detection bracket 133 goes out from between the light-emitting device 130 of the upper home position sensor S1 and the photo-electric element 131. A position, in which the detection bracket 133 goes out from between the light-emitting device 130 of the upper home position sensor S1 and the photo-electric element 131, is denoted as a starting position (the home position) of the reference pin 36.

Next, the driving motor 122 of the width direction moving unit 39 shown in FIG. 6 is driven, and the conveying pin 42 is moved via the moving member 114, so that the plate 12 bumps against the reference pin 36. Thus, the provisional positioning of the plate 12 is implemented. After the provisional positioning of the plate 12 is implemented, the conveying pin 42 goes back as indicated by the arrow A1. In the state of the provisional positioning of the plate 12, the plate feed guide 20 of the conveying guide unit 14 faces the punch section 16 (the position depicted by the dot dash line in FIG. 3).

When the preset member 30 goes down from the upper of the plate feed guide 20, as shown in step 2 in FIG. 9, the conveying rollers 24 and 28 convey the plate 12 forward (Y1-direction) so that the front edge of the plate 12 bumps against a pair of first positioning pins 48 of the punch section 16. The conveying rollers 24 and 28 rotate and slip with the plate 12. Next, the conveying pin 42 conveys the plate 12 in the right direction to bump against the reference pin 36, so that the punch section 16 implements the regular positioning of the plate 12 in the state that the plate 12 is put on the plate feed guide 20. In effect, the positioning of the plate 12 is implemented at three points of a pair of first positioning pins 48 and the reference pin 36.

As shown in the step 2, when the plate 12 bumps against the first positioning pins 48, there is formed on the front edge of the plate 12 a plastic deformation due to an impact with the first positioning pins 48, that is, hitting marks P1.

Next, as shown in step 3, in order to displace the contact positions of the front edge of the plate 12 with the first positioning pins 48 from the hitting marks P1, the plate 12 is moved via the reference pin 36 by an arbitrary distance t1 in the left direction X1. While the distance t1 is arbitrary, it is preferable that the distance t1 is short as much as possible as far as the reference position P0 is displaced. This state is a regular positioning state at the time of punching of the plate 12. The contact points P0 of the front edges of the plate 12 in the regular positioning state at the time of punching of the plate 12 with the first positioning pins 48 are referred to as the reference position. At the front edge portion of the plate 12 subjected to the regular positioning, there are formed by the punch unit 46 a predetermined number of punched holes, for example, long punched holes 49*a* and circular punched holes 49*b*. Those punched holes 49*a* and 49*b* are criterion for winding the printing plate formed on the plate 12 through image exposure around a plate cylinder of a rotary press of a printing apparatus (not illustrated), and are used for positioning in the printing processing in the printing apparatus.

When the punch unit 46 terminates the punched hole forming processing, as shown in step 4, the plate 12 is moved via the conveying pin 42 by an arbitrary distance t2 in the right direction X2. While the distance t2 is arbitrary, the contact positions of the front edges of the plate 12 with the first positioning pins 48 are moved regardless of the hitting marks P1 to positions opposite to the positions in the step 3 with respect to the hitting marks P1.

Next, the reversal rotation of the conveying roller 24 causes the plate 12 to return onto the plate feed guide 20 and causes a pair of preset members 30 to project over the plate feed guide 20, and as shown in step 5, the plate 12 is conveyed in a direction Y2 to bump against the preset member 30, so that the provisional positioning is implemented in a similar fashion to that as mentioned above. In the state of the provisional positioning, the conveyance path is changed over. That is, the conveying guide unit 14 is rotatably moved so that the plate feed guide 20 is set up to a position (the position depicted by the solid line in FIG. 3) over against the exposure section 18. After the preset member 30 goes down from the upper of the plate feed guide 20, as shown in step 6, the conveying roller 24 conveys the plate 12 forward (a direction Y3) so that the front edge of the plate 12 bumps against a pair of second positioning pins 52 of the rotating drum 50. At that time, the conveying rollers 24 and 28 rotate and slip with the plate 12. As shown in step 6, when the plate 12 bumps against the second positioning pins 52, there is formed on the front edge of the plate 12 a plastic deformation due to an impact with the second positioning pins 52, that is, hitting marks P2.

Next, as shown in step 7, the plate 12 is moved via the reference pin 36 by a distance t2 in the left direction X3, so that the second positioning pins 52 contact with the reference positions P0. In other words, the plate 12 is moved in the left direction X3 by a distance t3 that the second positioning pins 52 contact with the reference positions P0. A position of the width direction of the plate 12 in the step 7 is the same as the position of the width direction of the plate 12 in the step 3. The position of the plate 12 in the step 7 is a feed position to the rotating drum 50, or the position of the image exposure preparation.

Thereafter, as mentioned above, the plate 12 is wound around the rotating drum 50 and the recording head section 66 is moved to perform an exposure.

As mentioned above, in the regular positioning state at the time of the punched hole forming, the contact positions of the plate 12 with the first positioning pins 48 are set up to positions (the reference positions) displaced from the hitting marks P1. In the regular positioning state at the time of supply of the plate 12 to the rotating drum 50, the contact positions of the plate 12 with the second positioning pins 52 are set up to positions (the reference positions) displaced from the hitting marks P2. This reason is as follows.

Size and geometry of the hitting marks P1 and P2 vary in accordance with geometry (not always straight) of the front edge of the plate 12, the slant of the plate 12 at the time of conveyance, and the conveyance velocity. For this reason, a posture of the plate 12 in the step 2 and step 6 is not necessarily constant. Accordingly, when a plurality of plates 12 is subjected to punched hole formation in mutually different posture, the punched holes 49*a* and 49*b* would be slightly displaced on each the plate 12. Further, when the plates 12 are supplied to the rotating drum 50 in different posture, the winding position around the rotating drum 50 would be slightly displace. For this reason, the regular positioning at the time of punched hole formation is carried out at the positions (reference positions P0) wherein the contact positions of the plate 12 with the first positioning pins 48 are displaced from the hitting marks P1. And the regular positioning at the time of supply of the plate 12 to the rotating drum 50 is carried out at the positions (reference positions P0) wherein the contact positions of the plate 12 with the second positioning pins 52 are displaced from the hitting marks P2. This feature makes it possible to exactly perform the positioning at the time of punched hole formation and the time of supply of the plate 12 to the rotating drum 50 independent of the hitting marks P1 and P2.

Further, the contact point of the first positioning pins 48 with the front edge of the plate 12 in the state (the step 3) of the regular positioning at the time of the punched hole formation, and the contact point of the second positioning pins 52 with the front edge of the plate 12 in the state (the step 7) of the regular positioning at the time of supply of the plate 12 to the rotating drum 50, are both the reference points P0. Thus, even if the edge of the plate 12 brings about a bend, it is possible to implement coincidence between the punched hole formation position and the regular positioning position of the plate 12 at the time of supply of the plate 12 to the rotating drum 50.

Figure 10:
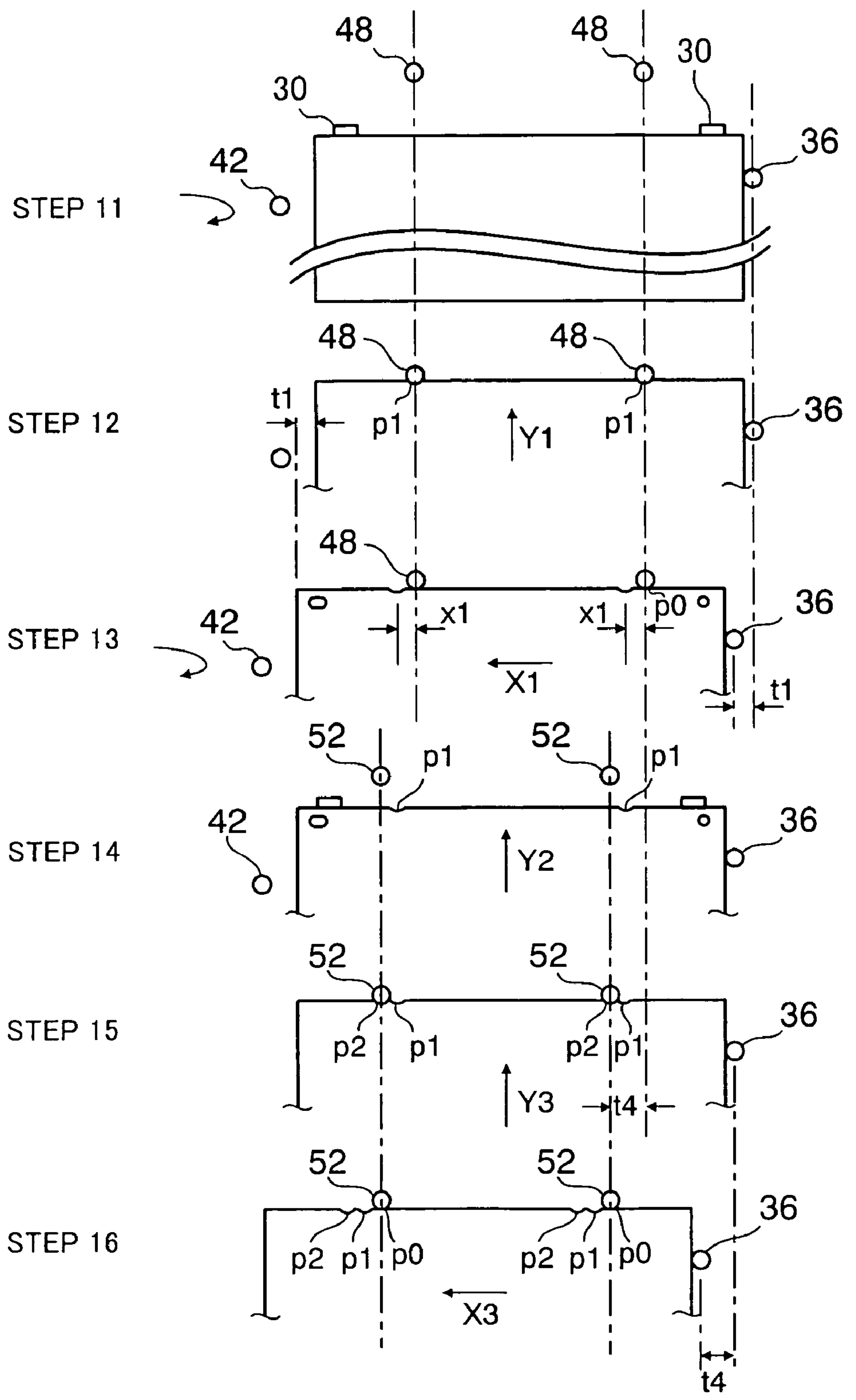
FIG. 10 is an explanatory view useful for understanding steps of positioning of a plate according to an embodiment 2.

FIG. 10 is an explanatory view useful for understanding steps of positioning of a plate according to an embodiment 2. According to the embodiment 2, the second positioning pins 52 are disposed at positions displaced by an arbitrary distance t4 in a horizontal direction with respective to the first positioning pins 48.

Hereinafter, there will be explained an operation for positioning of the plate 12 referring to FIG. 3 and FIG. 10.

Step 11 to step 13 are the same as the step 1 to step 3 in FIG. 9.

In step 14, the reversal rotation of the conveying roller 24 causes the plate 12 to return to the plate feed guide 20 and causes a pair of preset members 30 to project over the plate feed guide 20, so that the plate 12 is conveyed in the direction Y2 to bump against the preset members 30. Thus, again the provisional positioning is carried out in a similar fashion to that as mentioned above. In the state of the provisional positioning, the conveyance path is changed over. That is, the conveying guide unit 14 is rotatably moved so that the plate feed guide 20 is set up to a position (the position depicted by the solid line in FIG. 3) over against the exposure section 18. After the preset member 30 goes down from the upper of the plate feed guide 20, as shown in step 15, the conveying roller 24 conveys the plate 12 forward (a direction Y3) so that the front edge of the plate 12 bumps against a pair of second positioning pins 52 of the rotating drum 50. At that time, the conveying rollers 24 and 28 rotate and slip with the plate 12. As shown in step 16, when the plate 12 bumps against the second positioning pins 52, there is formed on the front edge of the plate 12 a plastic deformation due to an impact with the second positioning pins 52, that is, hitting marks P2.

Next, as shown in step 16, the plate 12 is moved by a distance t4 in the left direction X3, so that the second positioning pins 52 contact with the reference positions P0. In other words, the plate 12 is moved in the left direction X3 by a distance t4 that the second positioning pins 52 contact with the reference positions P0. A position of the width direction of the plate 12 in the step 16 is the same as the position of the width direction of the plate 12 in the step 3. The position of the plate 12 in the step 16 is a feed position to the rotating drum 50, or the position of the image exposure preparation.

According to the embodiment 3, the second positioning pins 52 are disposed beforehand at positions displaced by an arbitrary distance t4 in a lateral direction with respect to the first positioning pins 48. This feature makes it possible to omit the step 4 in the embodiment 1.

While the above-mentioned embodiments show examples of the plate positioning at the times of the punch processing and the image exposure processing, the present invention is applicable to method and apparatus in which two or more sorts of processing are applied.

As mentioned above, according to a plate positioning and processing method and a plate positioning and processing apparatus of the present invention, even if hitting marks are formed on the front edge of the plate owing to the contact with the positioning pins, it is possible to perform the positioning of the plate always in the same posture, removing the influence of hitting marks onto the plate at the times of first processing and second processing. Further, according to the present invention, portions of the front edges of the plate, which contact with positioning pins in the times of first processing and second processing, are the same reference positions. This feature makes it possible to implement complete coincidence of the positions of the plate in both processing times, even if the front edge of the plate brings about bends and the like.

Although the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A plate positioning and processing method comprising:

a first step of conveying a plate in a predetermined first direction so that the plate is in contact with a pair of first positioning pins;

a second step of laterally moving the plate contacting with the first positioning pins until reference positions displaced from contacting positions of the plate with the first positioning pins contact with the first positioning pins;

a third step of applying a predetermined first processing to the plate;

a fourth step of conveying the plate subjected to the first processing in a predetermined second direction so that the plate is in contact with a pair of second positioning pins in positions different from the reference positions of front edge of the plate;

a fifth step of laterally moving the plate contacting with the second positioning pins until same positions as the reference positions contact with the second positioning pins; and a sixth step of applying a predetermined second processing to the plate.

2. A plate positioning and processing method according to claim 1, wherein between the third step and the fourth step there is a step of laterally moving the plate until predetermined positions of the front edge of the plate, which is different from the reference positions and the contacting positions, contact with the first positioning pins.

3. A plate positioning and processing apparatus comprising:

first conveying means that conveys a plate in a first predetermined direction;

a pair of first positioning pins that determine a position of the first predetermined direction of the plate in contact with a front edge of the plate to be conveyed in the first predetermined direction;

second conveying means that laterally moves the plate contacting with the first positioning pins until reference positions displaced from contacting positions of the plate with the first positioning pins contact with the first positioning pins;

first processing means that applies a predetermined first processing to the plate;

third conveying means that conveys the plate subjected to the first processing in a second predetermined direction;

a pair of second positioning pins that determine a position of the second predetermined direction of the plate in contact with positions of the front edge of the plate to be conveyed in the second predetermined direction, which positions are different from the reference positions;

fourth conveying means that laterally moves the plate contacting with the second positioning pins until same positions as the reference positions contact with the second positioning pins; and second processing means that applies a predetermined second processing to the plate.

4. A plate positioning and processing apparatus according to claim 3, wherein the plate positioning and processing apparatus further comprises fifth conveying means that laterally moves the plate until predetermined positions different from the reference positions and the contacting positions, of the front edge of the plate subjected to the first processing, contact with the first positioning pins, the second positioning pins are disposed at positions wherein the front edge of the plate contacts with same positions as the reference positions, in a case where the plate is conveyed by the third conveying means omitting processing that the plate is laterally moved by the fifth conveying means, and the third conveying means conveys the plate laterally moved by the fifth conveying means in the second predetermined direction.

5. A plate positioning and processing apparatus according to claim 3, wherein the second positioning pins are disposed at positions wherein the front edge of the plate conveyed by the third conveying means in the second predetermined direction, contacts with positions different from the reference positions.

6. A plate positioning and processing apparatus according to claim 3, wherein the first processing means is punch means that forms on the plate punched holes for positioning.

7. A plate positioning and processing apparatus according to claim 3, wherein the second processing means is exposure means that exposes images on the plate.

* * * * *